(12) United States Patent
Zaki et al.

(10) Patent No.: US 11,627,068 B2
(45) Date of Patent: *Apr. 11, 2023

(54) UTILIZING A CENTRALIZED CONTROLLER FOR TRAFFIC ENGINEERING SEGMENT ROUTING INTER-AUTONOMOUS SYSTEMS

(71) Applicant: Juniper Networks, Inc., Sunnyvale, CA (US)

(72) Inventors: Rosian Bin Md Zaki, Raritan, NJ (US); Richard M. Chen, Metuchen, NJ (US); Patricio Giecco, Upland, CA (US); Weiguo Lu, Great Neck, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,372

(22) Filed: Jan. 22, 2021

(65) Prior Publication Data

US 2021/0152463 A1  May 20, 2021

Related U.S. Application Data

(63) Continuation of application No. 16/370,564, filed on Mar. 29, 2019, now Pat. No. 10,917,331.

(51) Int. Cl.
*H04L 12/715* (2013.01)
*H04L 12/26* (2006.01)
(Continued)

(52) U.S. Cl.
CPC ............ *H04L 45/04* (2013.01); *H04L 43/028* (2013.01); *H04L 45/22* (2013.01); *H04L 45/28* (2013.01); *H04L 45/34* (2013.01)

(58) Field of Classification Search
None
See application file for complete search history.

(56) References Cited

U.S. PATENT DOCUMENTS 7,751,318 B2    7/2010   Venkat et al.
8,014,275 B1 *  9/2011   Sundt ..................... H04L 45/22
                                                  370/227
(Continued)

FOREIGN PATENT DOCUMENTS

CN        105847158 A      8/2016

OTHER PUBLICATIONS

Previdi S., et al., "Inter-Domain Routing BGP-LS extensions for Segment Routing BGP Egress Peer Engineering; draft-ietf-idr-bgpls-segment-routing-epe-10", IETF, Mar. 9, 2017, pp. 1-21.
(Continued)

*Primary Examiner* — Saba Tsegaye
(74) *Attorney, Agent, or Firm* — Harrity & Harrity, LLP

(57) ABSTRACT

A device receives border gateway protocol (BGP) data associated with links provided in a segment routing network. The segment routing network includes a first autonomous system (AS) with first network devices interconnected by a first portion of the links, a second AS with second network devices interconnected by a second portion of the links, and an inter-AS link provided between one of the first network devices and one of the second network devices. The device filters prefixes of the BGP data to identify BGP data associated with the inter-AS link, where the BGP data associated with the inter-AS link includes data identifying state information associated with the inter-AS link. The device determines an operational state of the inter-AS link based on the BGP data associated with the inter-AS link, and performs one or more actions based on the operational state of the inter-AS link.

20 Claims, 14 Drawing Sheets

(51) Int. Cl.
  *H04L 12/703* (2013.01)
  *H04L 12/721* (2013.01)
  *H04L 12/707* (2013.01)
  *H04L 45/02* (2022.01)
  *H04L 43/028* (2022.01)
  *H04L 45/00* (2022.01)
  *H04L 45/28* (2022.01)

(56) References Cited

U.S. PATENT DOCUMENTS

| | | | |
|---|---|---|---|
| 8,179,905 B1 * | 5/2012 | Napierala | H04L 12/4641 370/395.5 |
| 9,450,817 B1 | 9/2016 | Bahadur et al. | |
| 9,838,268 B1 | 12/2017 | Mattson | |
| 9,998,247 B1 | 6/2018 | Choudhury et al. | |
| 10,917,331 B1 | 2/2021 | Zaki et al. | |
| 2006/0233181 A1 | 10/2006 | Raszuk et al. | |
| 2007/0091794 A1 | 4/2007 | Filsfils et al. | |
| 2008/0219153 A1 * | 9/2008 | Shand | H04L 45/22 370/225 |
| 2010/0061230 A1 | 3/2010 | Xiong et al. | |
| 2012/0224506 A1 * | 9/2012 | Gredler | H04L 45/121 370/254 |
| 2016/0226760 A1 | 8/2016 | Liljenstolpe et al. | |
| 2017/0289027 A1 | 10/2017 | Ratnasingham | |

OTHER PUBLICATIONS

Previdi S., et al., "Inter-Domain Routing BGP-LS extensions for Segment Routing BGP Egress Peer Engineering; draft-ietf-idr-bgpls-segment-routing-epe-11", IETF, Mar. 13, 2017, pp. 1-21.
Extended European Search Report for Application No. EP19217603.0, dated Jul. 7, 2020, 13 pages.
Filsfils C., et al., "Segment Routing Centralized BGP Egress Peer Engineering; draft-ietf-spring-segment-routing-central-epe-10.txt", Internet Engineering Task Force (IETF), Dec. 21, 2017, pp. 1-19, XP015124891.
Hegde S., et al., "BGP-LS Extensions for Inter-As TE using EPE based mechanisms; draft-hegde-idr-bgp-ls-epe-inter-as-00.txt", IETF, Mar. 11, 2019, pp. 1-7, XP015131765, [retrieved on Mar. 11, 2019] Retrieved from the Internet [URL: https://tools.ietf.org/html/draft-hegde-ldr-bgp-ls-epe-inter-as-00].
Previdi S., et al., "Inter-Domain Routing BGP-LS extensions for Segment Routing BGP Egress Peer Engineering; draft-ietf-idr-bgpls-segment-routing-epe-18", IETF, Mar. 24, 2019, 18 pages, XP055696325.

* cited by examiner

UTILIZING A CENTRALIZED CONTROLLER FOR TRAFFIC ENGINEERING SEGMENT ROUTING INTER-AUTONOMOUS SYSTEMS

RELATED APPLICATION

This application is a continuation of U.S. patent application Ser. No. 16/370,564, filed Mar. 29, 2019 (now U.S. Pat. No. 10,917,331), which is incorporated herein by reference.

BACKGROUND

A wide variety of user devices (e.g., smartphones, tablets, and/or the like) connect to service provider networks to access resources and services provided by packet-based data networks, such as the Internet, enterprise intranets, content providers, virtual private networks (VPNs), and/or the like. Each service provider network typically provides an extensive network infrastructure to provide packet-based data services to the user devices. Each service provider network may include a wide area network (WAN), such as a single autonomous system (AS) within a WAN that includes multiple autonomous systems, two or more autonomous systems within the WAN, and/or the like.

SUMMARY

According to some implementations, a method may include receiving border gateway protocol (BGP) data associated with a plurality of links provided in a segment routing network, wherein the segment routing network may include a first autonomous system with a first plurality of network devices interconnected by a first portion of the plurality of links, a second autonomous system with a second plurality of network devices interconnected by a second portion of the plurality of links, and at least one inter-autonomous system link, of the plurality of links, provided between one of the first plurality of network devices and one of the second plurality of network devices. The method may include filtering prefixes of the BGP data to identify BGP data associated with the at least one inter-autonomous system link, wherein the BGP data associated with the at least one inter-autonomous system link may include data identifying state information associated with the at least one inter-autonomous system link. The method may include determining an operational state of the at least one inter-autonomous system link based on the BGP data associated with the at least one inter-autonomous system link, and performing one or more actions based on the operational state of the at least one inter-autonomous system link.

According to some implementations, a device may include one or more memories and one or more processors, communicatively coupled to the one or more memories, to receive link data associated with a plurality of links provided in a segment routing network, wherein the segment routing network may include a first autonomous system with a first plurality of network devices interconnected by a first portion of the plurality of links, a second autonomous system with a second plurality of network devices interconnected by a second portion of the plurality of links, and at least one inter-autonomous system link, of the plurality of links, provided between one of the first plurality of network devices and one of the second plurality of network devices. The one or more processors may determine data associated with the at least one inter-autonomous system link based on the link data, wherein the data associated with the at least one inter-autonomous system link may include data identifying state information associated with the at least one inter-autonomous system link. The one or more processors may determine an operational state of the at least one inter-autonomous system link based on the data associated with the at least one inter-autonomous system link and may perform one or more actions based on the operational state of the at least one inter-autonomous system link.

According to some implementations, a non-transitory computer-readable medium may store instructions that include one or more instructions that, when executed by one or more processors of a device, may cause the one or more processors to cause bidirectional forwarding detection (BFD) sessions to be established for a plurality of links provided in a segment routing network, wherein the segment routing network may include a first autonomous system with a first plurality of network devices interconnected by a first portion of the plurality of links, a second autonomous system with a second plurality of network devices interconnected by a second portion of the plurality of links, and at least one inter-autonomous system link, of the plurality of links, provided between one of the first plurality of network devices and one of the second plurality of network devices. The one or more instructions may cause the one or more processors to receive BFD session data associated with the at least one inter-autonomous system link, wherein the BFD session data associated with the at least one inter-autonomous system link may include data identifying state information associated with the at least one inter-autonomous system link. The one or more instructions may cause the one or more processors to determine an operational state of the at least one inter-autonomous system link based on the BFD session data associated with the at least one inter-autonomous system link and perform one or more actions based on the operational state of the at least one inter-autonomous system link.

DETAILED DESCRIPTION

Figure 1A:
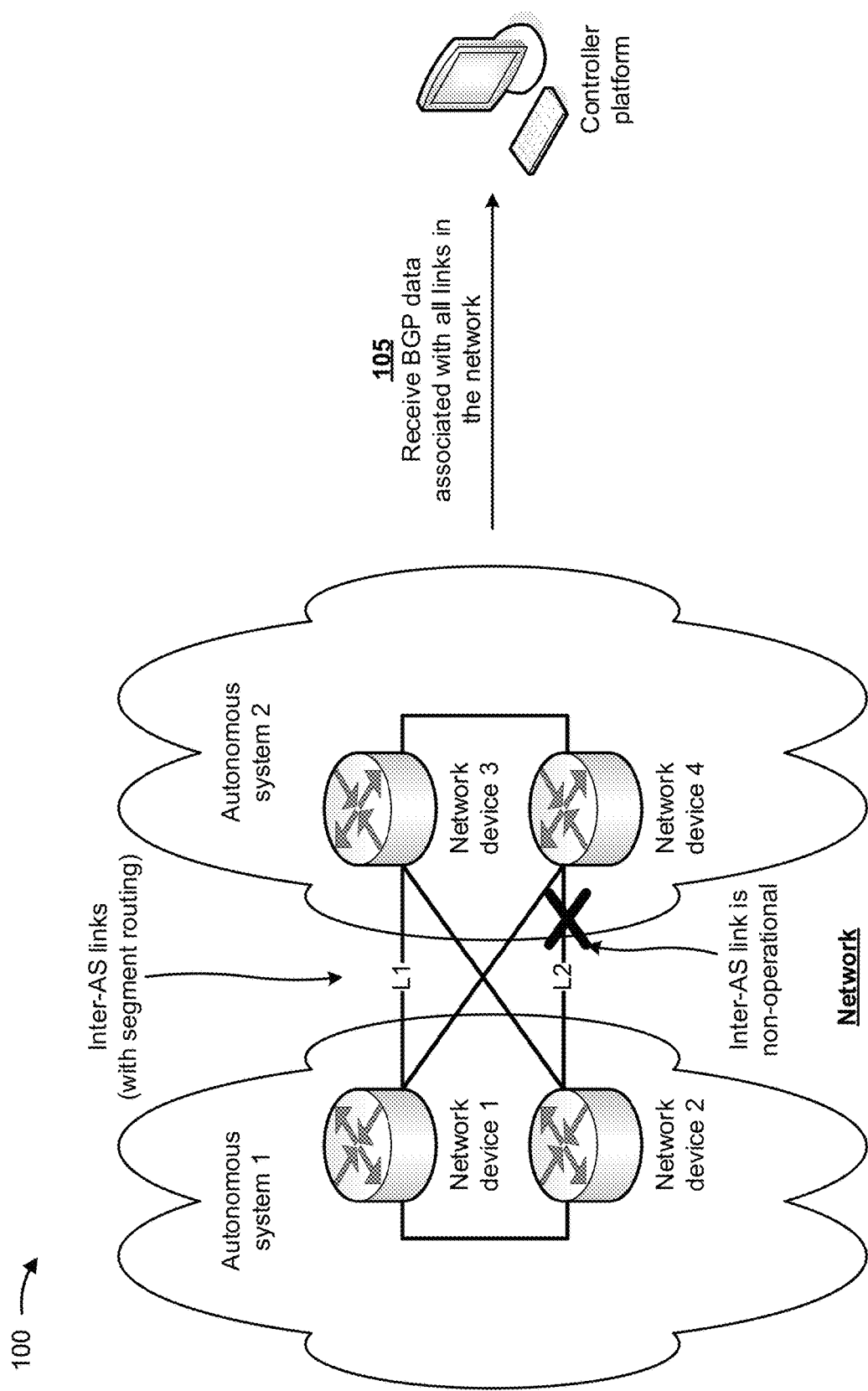
FIGS. 1A-1I are diagrams of one or more example implementations described herein.

The following detailed description of example implementations refers to the accompanying drawings. The same reference numbers in different drawings may identify the same or similar elements.

Traffic engineering is a method of optimizing a performance of a network by dynamically analyzing, predicting, and regulating behavior of data transmitted over the network. Techniques of traffic engineering can be applied to different types of networks, such as a packet optical network, a public switched telephone network (PSTN), a local area network (LAN), a WAN with autonomous systems, a cellular telephone network, the Internet, and/or the like.

In some environments, two service provider networks (e.g., two autonomous systems) may be interconnected by inter-autonomous system (inter-AS) links. An inter-AS link may be connected by two or more network devices via segment routing. Segment routing, a form of computer networking, is a variant of source routing. In a segment routing network, an ingress network device may prepend a header to packets (e.g., traffic) that contain a list of segments, which are instructions that are executed on subsequent network devices in the network. These instructions may include forwarding instructions, such as an instruction to forward a packet to a specific destination or interface.

However, in segment routing, no state or session information is maintained when an inter-AS link is created between network devices. Without the state or session information, the network devices are unaware of an operational state of the inter-AS link and may unsuccessfully attempt to forward traffic on a non-operational inter-AS link. This causes traffic to be lost and causes computing resources (e.g., processing resources, memory resources, and/or the like), networking resources, and/or the like to be wasted in identifying the lost traffic, correcting the non-operational inter-AS link, re-routing the lost traffic, and/or the like.

Some implementations described herein provide a controller platform that utilizes a centralized controller for traffic engineering segment routing inter-autonomous systems. For example, the controller platform may receive border gateway protocol (BGP) data associated with links provided in a segment routing network. The segment routing network may include a first autonomous system (AS) with first network devices interconnected by a first portion of the links, a second AS with second network devices interconnected by a second portion of the links, and at least one inter-AS link, of the links, provided between one of the first network devices and one of the second network devices. The controller platform may filter prefixes of the BGP data to identify BGP data associated with the at least one inter-AS link, wherein the BGP data associated with the at least one inter-AS link may include data identifying state information associated with the at least one inter-AS link. The controller platform may determine an operational state of the at least one inter-AS link based on the BGP data associated with the at least one inter-AS link and may perform one or more actions based on the operational state of the at least one inter-AS link.

In this way, the controller platform may traffic engineer segment routing inter-AS links. This, in turn, conserves computing resources (e.g., processing resources, memory resources, and/or the like), networking resources, and/or the like that would otherwise be wasted in identifying traffic lost on non-operational inter-AS links, correcting the non-operational inter-AS links, re-routing the lost traffic, and/or the like.

FIGS. 1A-1I are diagrams of one or more example implementations 100 described herein. As shown in FIG. 1A, a network may be associated with a controller platform. In some implementations, the network may include a packet optical network with multiple network devices and multiple links provided between the multiple network devices. For example, as shown in FIG. 1A, the network may include a first autonomous system network (e.g., autonomous system 1) that includes, for example, two network devices (e.g., network device 1 and network device 2) interconnected by a link; and a second autonomous system network (e.g., autonomous system 2) that includes, for example, two network devices (e.g., network device 3 and network device 4) interconnected by a link. In some implementations, each of the network devices may include a provider edge (PE) network device, an autonomous system border router (ASBR), a peer ASBR, and/or the like.

As further shown in FIG. 1A, the four network devices may interconnect (e.g., to provide connections between the first autonomous system and the second autonomous system) via inter-AS links that utilize segment routing. For example, the first network device may interconnect with the third network device via a first inter-AS link (L1), and the second network device may interconnect with the fourth network device via a second inter-AS link (L2). In the example shown in FIG. 1A, the second inter-AS link (L2) may be non-operational due to overloading of the second inter-AS link, breakage of the second inter-AS link, and/or the like.

As further shown in FIG. 1A, and by reference number 105, the controller platform may receive border gateway protocol (BGP) data associated with all links in the network. BGP is a standardized exterior network device protocol designed to exchange routing and reachability information among autonomous systems (AS). The protocol is classified as a path vector protocol, and makes routing decisions based on paths, network policies, rule-sets, and/or the like. In some implementations, the BGP data may include data identifying types of the links, protocols used by the links, network devices to which the links are connected, ports associated with the network devices, states associated with the links (e.g., an operational state, a non-operational state, an idle state, a connect state, an active state, and/or the like), results of keepalive messages that maintain connections on the links, and/or the like.

The controller platform may periodically receive the BGP data from the network (e.g., at particular time intervals in seconds, minutes, hours, days, and/or the like), may continuously receive the BGP data from the network, and/or the like. For example, the controller platform may provide, to the network devices, a request for the BGP data, and the network devices may provide the BGP data to the controller platform based on the request.

Although FIG. 1A shows specific quantities of autonomous systems, network devices, links, and/or the like, in some implementations, the network may include more autonomous systems, network devices, links, and/or the like than depicted in FIG. 1A. For example, the network may include hundreds, thousands, and/or the like of network devices and/or links that generate thousands, millions, billions, etc. of data points. In this way, the controller platform may handle thousands, millions, billions, etc. of data points within a time period (e.g., when determining traffic plans), and thus may provide "big data" capability.

Figure 1B:
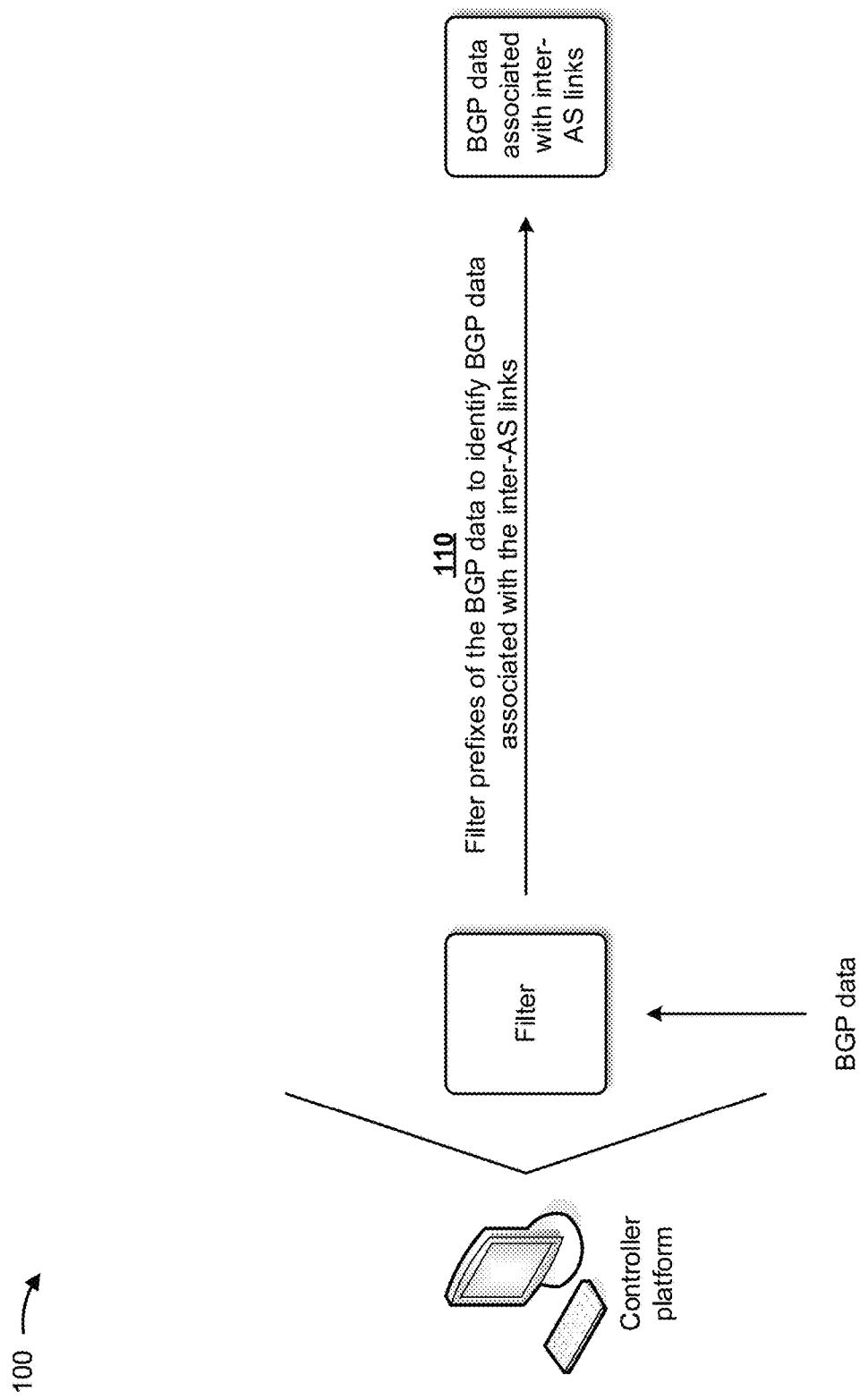

As shown in FIG. 1B, and by reference number 110, the controller platform may filter prefixes of the BGP data to identify BGP data associated with the inter-AS links. In some implementations, the BGP data may include prefixes that identify links associated with the BGP data. A BGP prefix may be referred to as a route announcement (e.g., that includes a particular link) and may identify a path of a packet through a network. In some implementations, the controller platform may have access to information identifying the prefixes associated with the inter-AS links, and may utilize this information to separate, from the BGP data, the BGP data associated with the inter-AS links. Once the BGP data associated with the inter-AS links is separated from the remaining BGP data, the controller platform may store the BGP data associated with the inter-AS links in a data structure (e.g., database, a table, a list, and/or the like) associated with the controller platform. The controller platform may also process the BGP data associated with the inter-AS links as described below. In this way, the controller platform may conserve resources (e.g., processing resources, memory resources, and/or the like) that would otherwise be wasted processing and/or storing all of the BGP data.

Figure 1C:
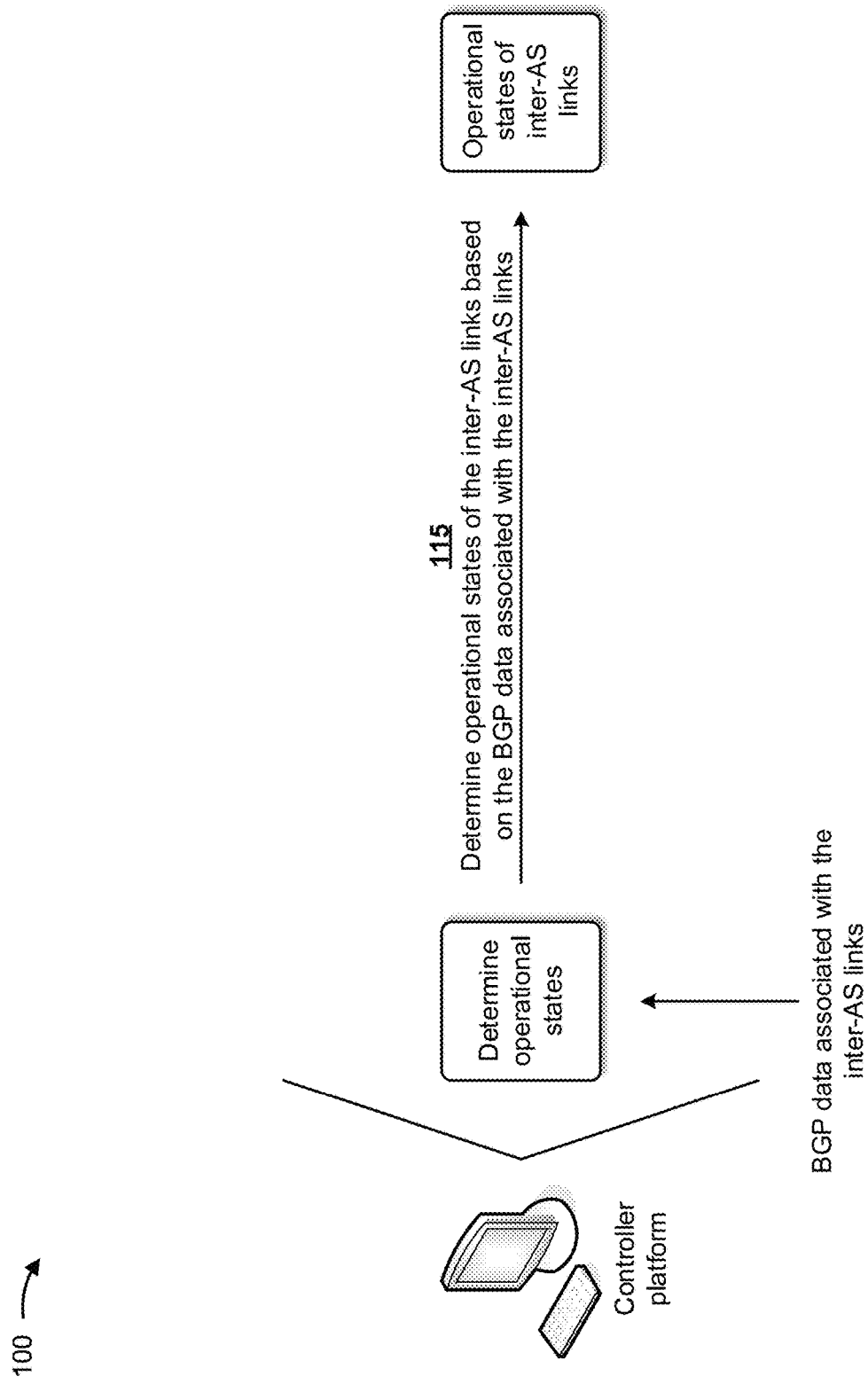

As shown in FIG. 1C, and by reference number 115, the controller platform may determine operational states of the inter-AS links based on the BGP data associated with the inter-AS links. In some implementations, the controller platform may determine the operational states of the inter-AS links based on the BGP data identifying the states associated with the inter-AS links (e.g., operational states, non-operational states, idle states, connect states, active states, and/or the like), results of keepalive messages that maintain connections on the inter-AS links, and/or the like. For example, the controller platform may determine that the first inter-AS link (L1) (e.g., as shown in FIG. 1A) is operational based on the BGP data associated with the inter-AS links and may determine that the second inter-AS link (L2) (e.g., as shown in FIG. 1A) is non-operational based on the BGP data associated with the inter-AS links.

Figure 1D:
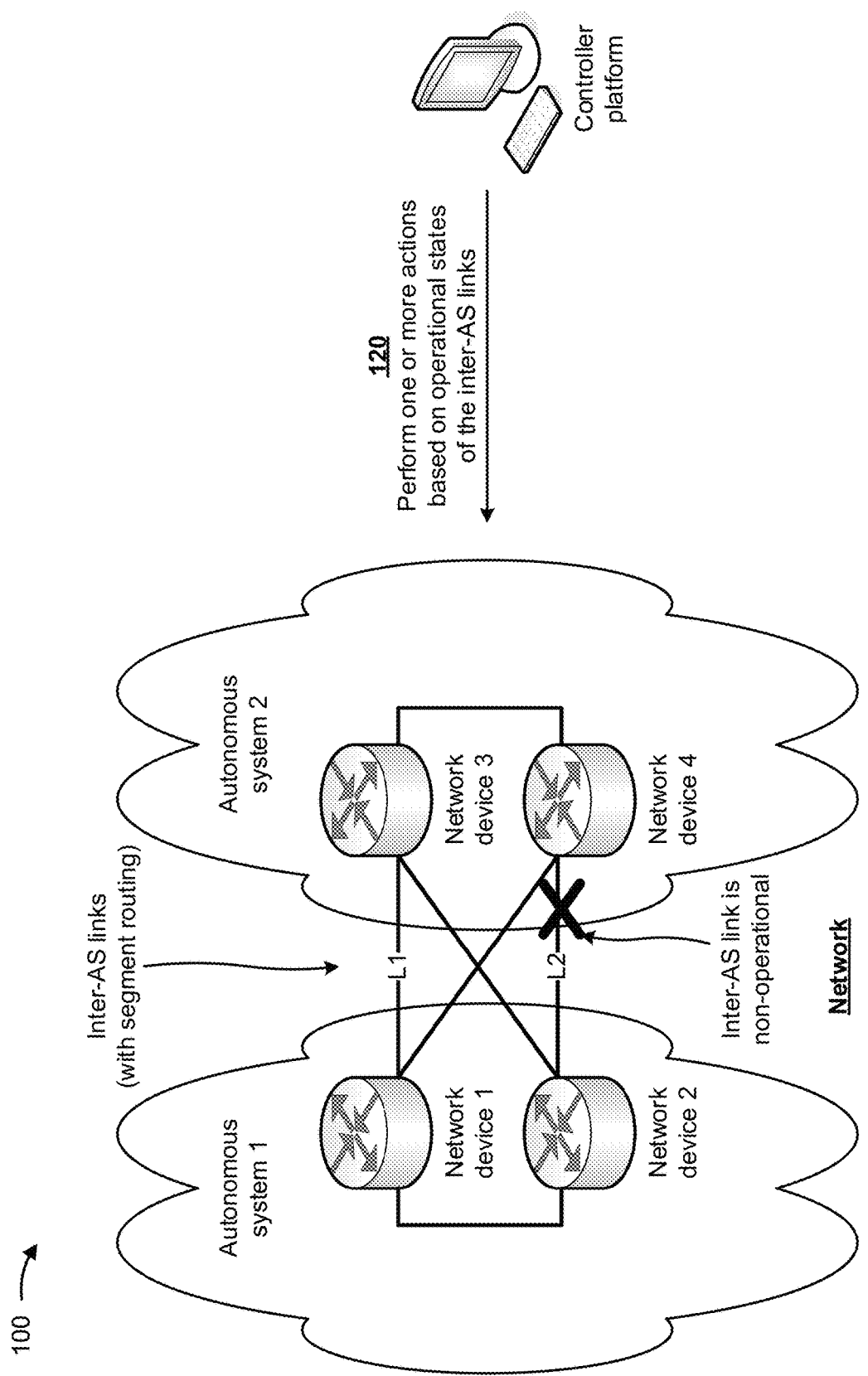

As shown in FIG. 1D, and by reference number 120, the controller platform may perform one or more actions based on the operational states of the inter-AS links. In some implementations, the one or more actions may include the controller platform causing network devices associated with non-operational inter-AS links to not utilize the non-operational inter-AS links. For example, as shown in FIG. 1D, the controller platform may cause the second network device and the fourth network device to not utilize the second inter-AS link (L2) since the second inter-AS link is non-operational. In some implementations, the controller platform may provide, to the second network device and the fourth network device, instructions to not utilize the second inter-AS link, and the second network device and the fourth network device may not utilize the second inter-AS link based on the instructions.

In some implementations, the one or more actions may include the controller platform causing network devices associated with non-operational inter-AS links to re-route traffic from the non-operational inter-AS links (e.g., to other operational links and/or inter-AS links). For example, as shown in FIG. 1D, the controller platform may cause the second network device and the fourth network device to re-route traffic from the second inter-AS link (L2) to one or more operational links and/or inter-AS links. In some implementations, the controller platform may provide, to the second network device and the fourth network device, instructions to re-route traffic from the second inter-AS link, and the second network device and the fourth network device may re-route traffic from the second inter-AS link based on the instructions.

In some implementations, the one or more actions may include the controller platform providing (e.g., to a client device) information indicating the operational states of the inter-AS links. For example, the controller platform may provide, to the client device, a user interface that includes the operational states of the inter-AS links. The client device may receive the user interface and may provide the user interface for display to a user of the client device, as described below in connection with FIG. 1I.

In some implementations, the one or more actions may include the controller platform causing a robot to be dispatched to repair the non-operational inter-AS links. For example, the controller platform may provide, to the robot, instructions to repair the non-operational inter-AS links, and the robot may repair the non-operational inter-AS links based on the instructions. In this way, the controller platform may conserve computing resources (e.g., processing resources, memory resources, and/or the like), networking resources, and/or the like that would otherwise be wasted in identifying traffic lost on non-operational inter-AS links, re-routing the lost traffic, and/or the like.

In some implementations, the controller platform may receive additional BGP data associated with the links after performing the one or more actions, and may filter prefixes of the additional BGP data to identify additional BGP data associated with the inter-AS links. The controller platform may determine that a particular inter-AS link is operational based on the additional BGP data associated with the inter-AS links, and may cause network devices associated with the particular inter-AS link to utilize the particular inter-AS link based on the particular inter-AS link being operational.

In some implementations, the controller platform may determine the operational states of the inter-AS links based on the BGP data associated with the inter-AS links and based on bidirectional forwarding detection (BFD) session data associated with the inter-AS links, as described below in connection with FIGS. 1E-1G.

Figure 1E:
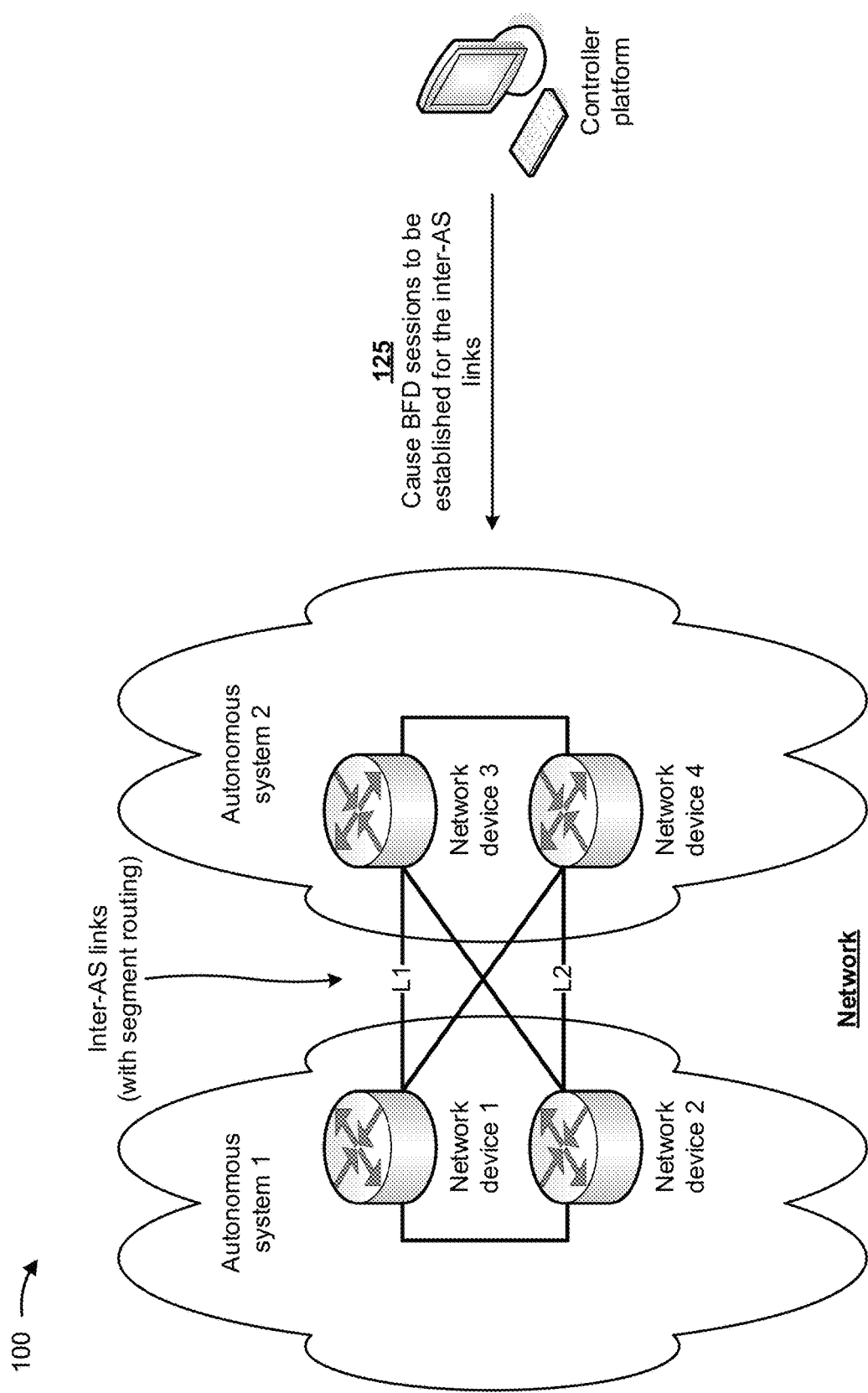

As shown in FIG. 1E, and by reference number 125, the controller platform may cause BFD sessions to be established for inter-AS links provided in the network. For example, the controller platform may cause BFD sessions to be established for the first inter-AS link (L1) and the second inter-AS link (L2). BFD is a network protocol that is used to detect faults between two network devices connected by a link. BFD provides low-overhead detection of faults even on physical media that do not support failure detection, such as Ethernet, virtual circuits, tunnels, label-switched paths, and/or the like. The controller platform may utilize BFD to establish a first session between the first network device and the third network device over the first inter-AS link, to establish a second session between the second network device and the fourth network device over the second inter-AS link, and/or the like. In some implementations, if more than one link exists between two network devices, multiple BFD sessions may be established to monitor each of the links. A BFD session may be established with a three-way handshake, may be terminated with a three-way handshake, may require authentication, and/or the like.

Figure 1F:
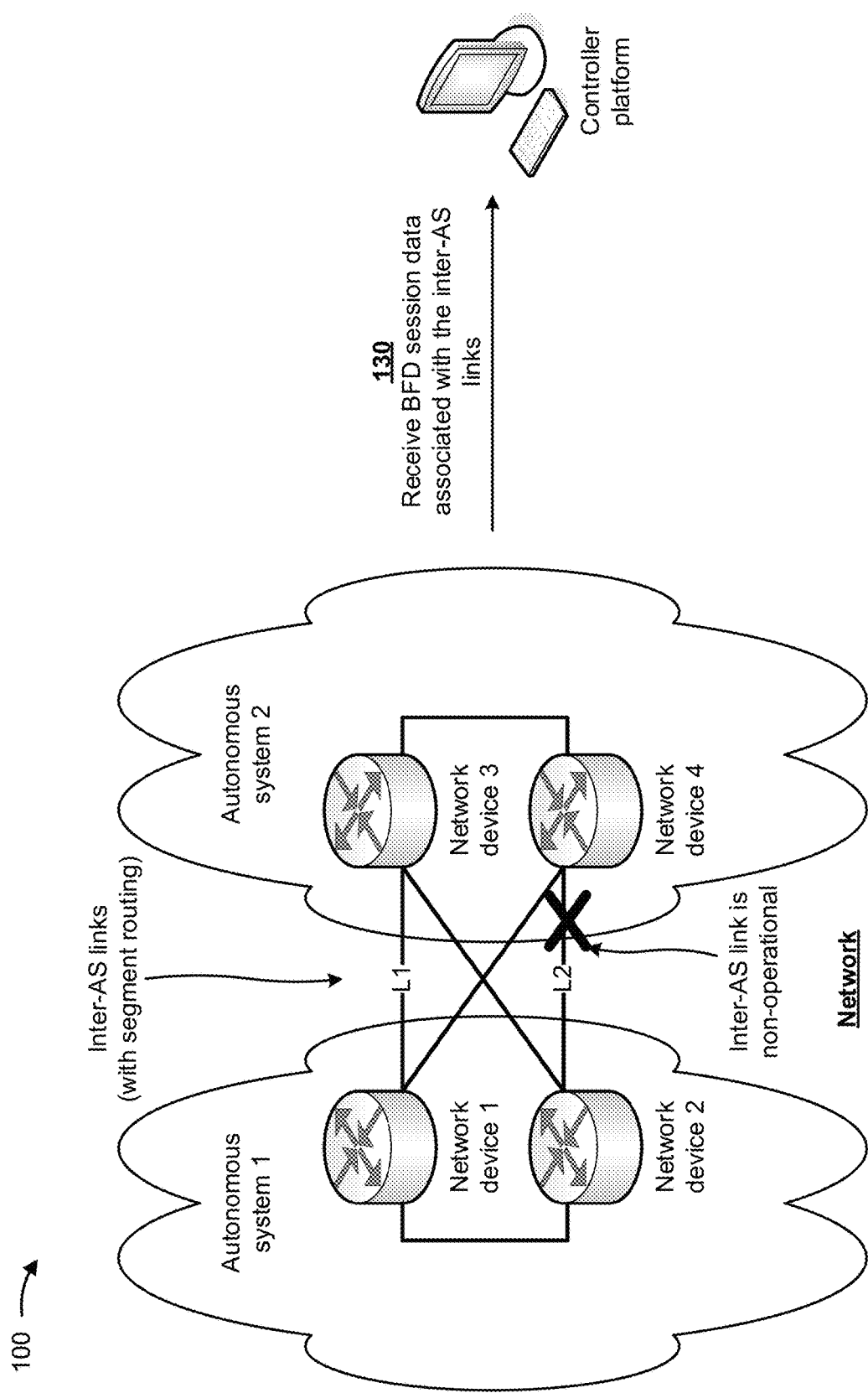

As shown in FIG. 1F, and by reference number 130, the controller platform may receive BFD session data associated with the inter-AS links. In some implementations, the BFD session data associated with the inter-AS links may include data identifying types of the inter-AS links, protocols used by the inter-AS links, network devices to which the inter-AS links are connected, ports associated with the network devices, states associated with the inter-AS links (e.g., an operational state, a non-operational state, an idle state, a connect state, an active state, and/or the like), and/or the like. The controller platform may store the BFD data associated with the inter-AS links in a data structure (e.g., a database, a table, a list, and/or the like) associated with the controller platform.

The controller platform may periodically receive the BFD data associated with the inter-AS links (e.g., at particular time intervals in seconds, minutes, hours, days, and/or the like), may continuously receive the BFD data associated with the inter-AS links, and/or the like. For example, the controller platform may provide, to the network devices, a request for the BFD data associated with the inter-AS links, and the network devices may provide the BFD data associated with the inter-AS links to the controller platform based on the request.

Figure 1G:
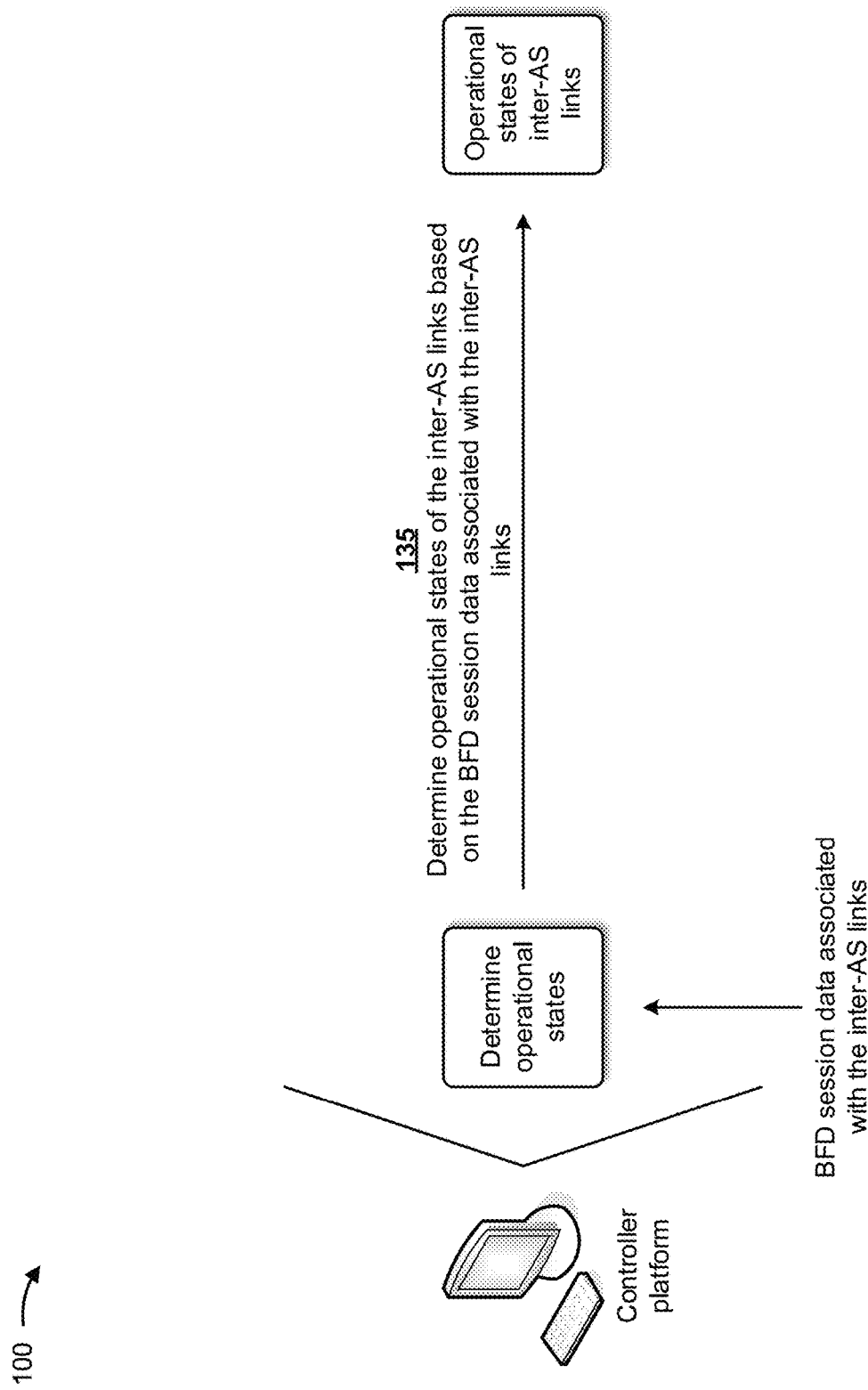

As shown in FIG. 1G, and by reference number 135, the controller platform may determine operational states of the inter-AS links based on the BFD data associated with the inter-AS links. In some implementations, the controller platform may determine the operational states of the inter-AS links based on the BFD data identifying the states associated with the inter-AS links (e.g., operational states, non-operational states, idle states, connect states, active states, and/or the like), and/or the like. For example, the controller platform may determine that the first inter-AS link (L1) (e.g., as shown in FIG. 1F) is operational based on the BFD data associated with the inter-AS links, and may determine that the second inter-AS link (L2) (e.g., as shown in FIG. 1F) is non-operational based on the BFD data associated with the inter-AS links.

Figure 1H:
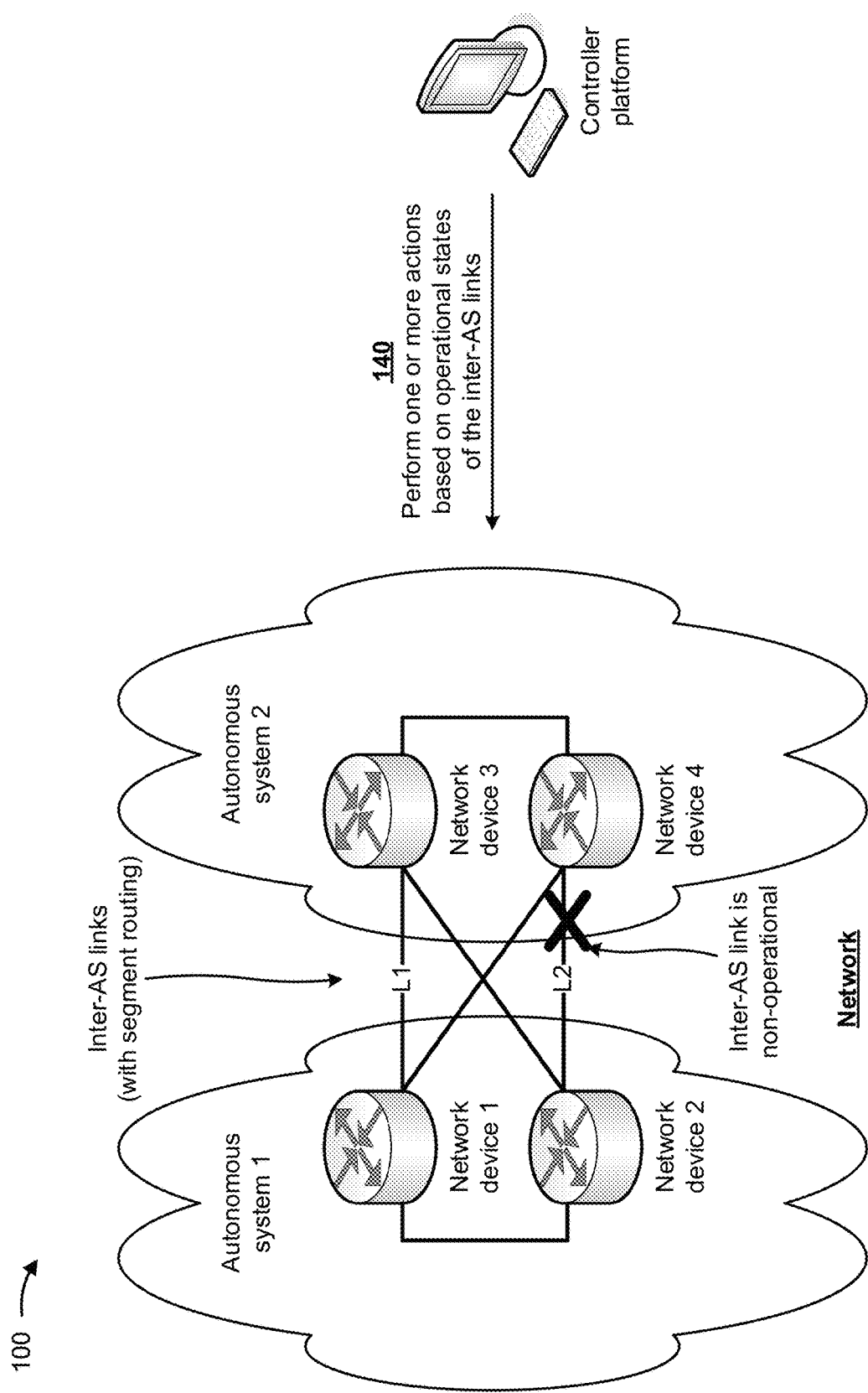

As shown in FIG. 1H, and by reference number 140, the controller platform may perform one or more actions based on the operational states of the inter-AS links. In some implementations, the one or more actions may include the controller platform causing network devices associated with non-operational inter-AS links to not utilize the non-operational inter-AS links. For example, as shown in FIG. 1H, the controller platform may cause the second network device and the fourth network device to not utilize the second inter-AS link (L2) since the second inter-AS link is non-operational. In some implementations, the controller platform may provide, to the second network device and the fourth network device, instructions to not utilize the second inter-AS link, and the second network device and the fourth network device may not utilize the second inter-AS link based on the instructions.

In some implementations, the one or more actions may include the controller platform causing network devices associated with non-operational inter-AS links to re-route traffic from the non-operational inter-AS links (e.g., to other operational links and/or inter-AS links). For example, as shown in FIG. 1H, the controller platform may cause the second network device and the fourth network device to re-route traffic from the second inter-AS link (L2) to one or more operational links and/or inter-AS links. In some implementations, the controller platform may provide, to the second network device and the fourth network device, instructions to re-route traffic from the second inter-AS link, and the second network device and the fourth network device may re-route traffic from the second inter-AS link based on the instructions.

In some implementations, the one or more actions may include the controller platform providing (e.g., to a client device) information indicating the operational states of the inter-AS links. For example, the controller platform may provide, to the client device, a user interface that includes the operational states of the inter-AS links. The client device may receive the user interface and may provide the user interface for display to a user of the client device, as described below in connection with FIG. 1I.

In some implementations, the one or more actions may include the controller platform causing a robot to be dispatched to repair the non-operational inter-AS links. For example, the controller platform may provide, to the robot, instructions to repair the non-operational inter-AS links, and the robot may repair the non-operational inter-AS links based on the instructions. In this way, the controller platform may conserve computing resources (e.g., processing resources, memory resources, and/or the like), networking resources, and/or the like that would otherwise be wasted in identifying traffic lost on non-operational inter-AS links, re-routing the lost traffic, and/or the like.

In some implementations, after performing the one or more actions, the controller platform may receive additional BFD data associated with a particular inter-AS link and may determine that the particular inter-AS link is operational based on the additional BFD data. The controller platform may cause two network devices associated with the particular inter-AS link to utilize the particular inter-AS link based on the particular inter-AS link being operational.

Figure 1I:
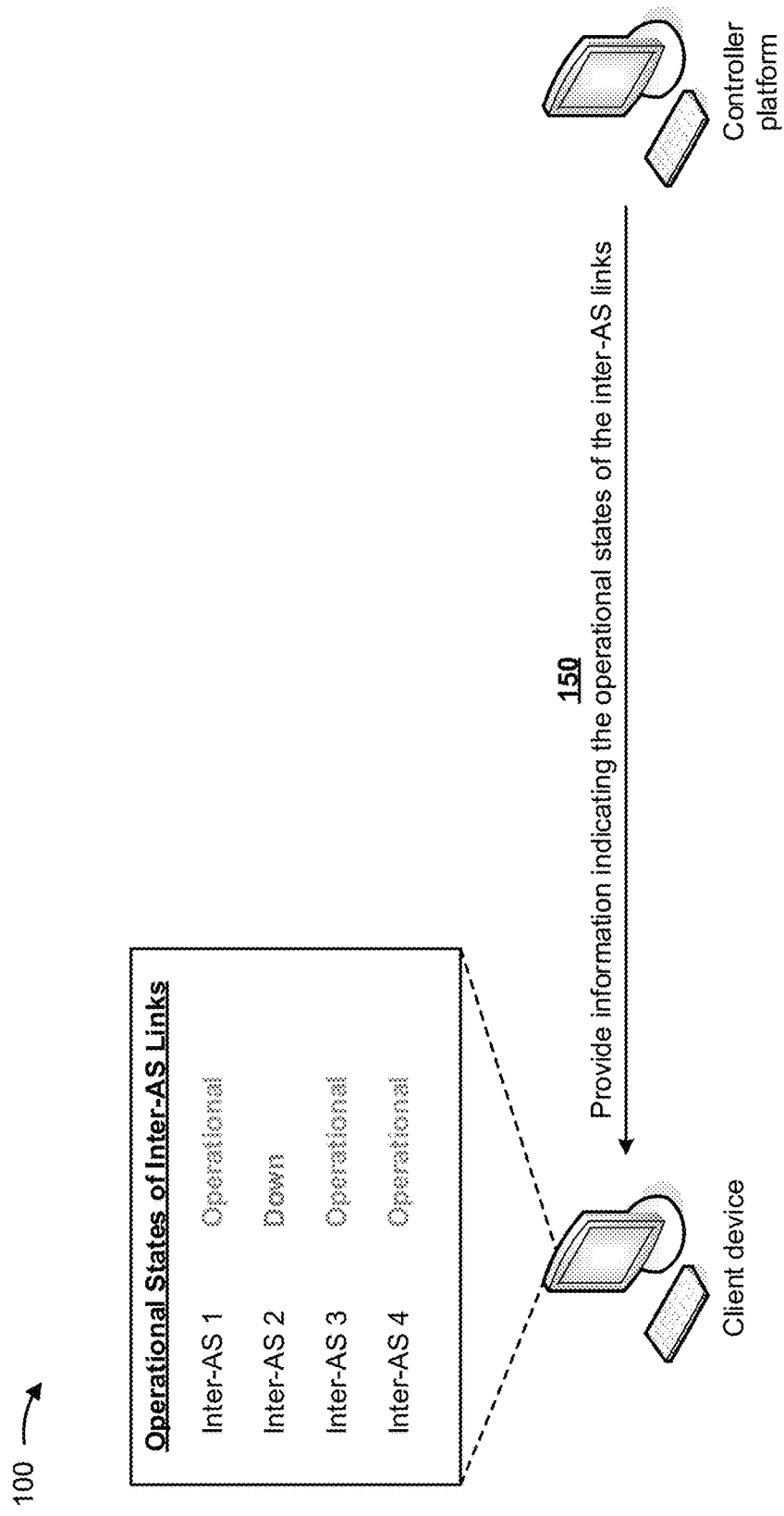

As shown in FIG. 1I, and by reference number 150, the controller platform may provide, to a client device, information indicating the operational states of the inter-AS links. In some implementations, the controller platform may generate a user interface that includes information indicating the operational states of the inter-AS links and may provide the user interface to the client device. The client device may receive the user interface and may display the user interface to a user of the client device. For example, as shown in FIG. 1I, the user interface may include information indicating that a first inter-AS link (e.g., inter-AS 1) is operational, a second inter-AS link (e.g., inter-AS 2) is non-operational or "down," a third inter-AS link (e.g., inter-AS 3) is operational, a fourth inter-AS link (e.g., inter-AS 4) is operational, and/or the like.

In some implementations, when performing the one or more actions described above in connection with FIGS. 1D and 1H, the controller platform may provide, to two network devices associated with a non-operational inter-AS link, information instructing the two network devices to cease utilization of the non-operational inter-AS link and to re-route traffic from the non-operational inter-AS link.

In some implementations, when performing the one or more actions described above in connection with FIGS. 1D and 1H, the controller platform may identify, when a first inter-AS link is non-operational, a second inter-AS link that is operational and provided between two network devices. The controller platform may cause the one of the two network devices to re-route traffic from the first inter-AS link to the second inter-AS link. In some implementations, the controller platform may identify the second inter-AS link based on a preference, a random selection technique, a round-robin technique, and/or the like.

In some implementations, when identifying the second inter-AS link, the controller platform may determine a first portion of the second inter-AS link through the first autonomous system based on a first set of parameters, may determine a second portion of the second inter-AS link between the first autonomous system and the second autonomous system based a second set of parameters, and may determine a third portion of the second inter-AS link through the second autonomous system based on a third set of parameters.

In some implementations, when identifying the second inter-AS link, the controller platform may select a preferred outgoing route for the first autonomous system, from multiple of outgoing routes, based on a first preference, where the preferred outgoing route may be provided from the first autonomous system to the second autonomous system. The controller platform may select a preferred incoming route for the first autonomous system, from multiple incoming routes, based on a second preference, where the preferred incoming route may be provided from the second autonomous system to the first autonomous system. The controller platform may identify the second inter-AS link based on the preferred outgoing route and the preferred incoming route.

In some implementations, the network devices interconnected via the inter-AS links may not be notified of operational states of the inter-AS links due to segment routing in the network.

In this way, the controller platform may traffic engineer segment routing inter-autonomous systems. This, in turn, conserves computing resources (e.g., processing resources, memory resources, and/or the like), networking resources, and/or the like that would otherwise be wasted in identifying traffic lost on non-operational inter-AS links, correcting the non-operational inter-AS links, re-routing the lost traffic, and/or the like. Furthermore, implementations described herein use a rigorous, computerized process to perform tasks that were not previously performed. For example, currently there does not exist a technique that utilizes a centralized controller for traffic engineering segment routing inter-autonomous systems.

As indicated above, FIGS. 1A-1I are provided merely as examples. Other examples may differ from what is described with regard to FIGS. 1A-1I.

Figure 2:
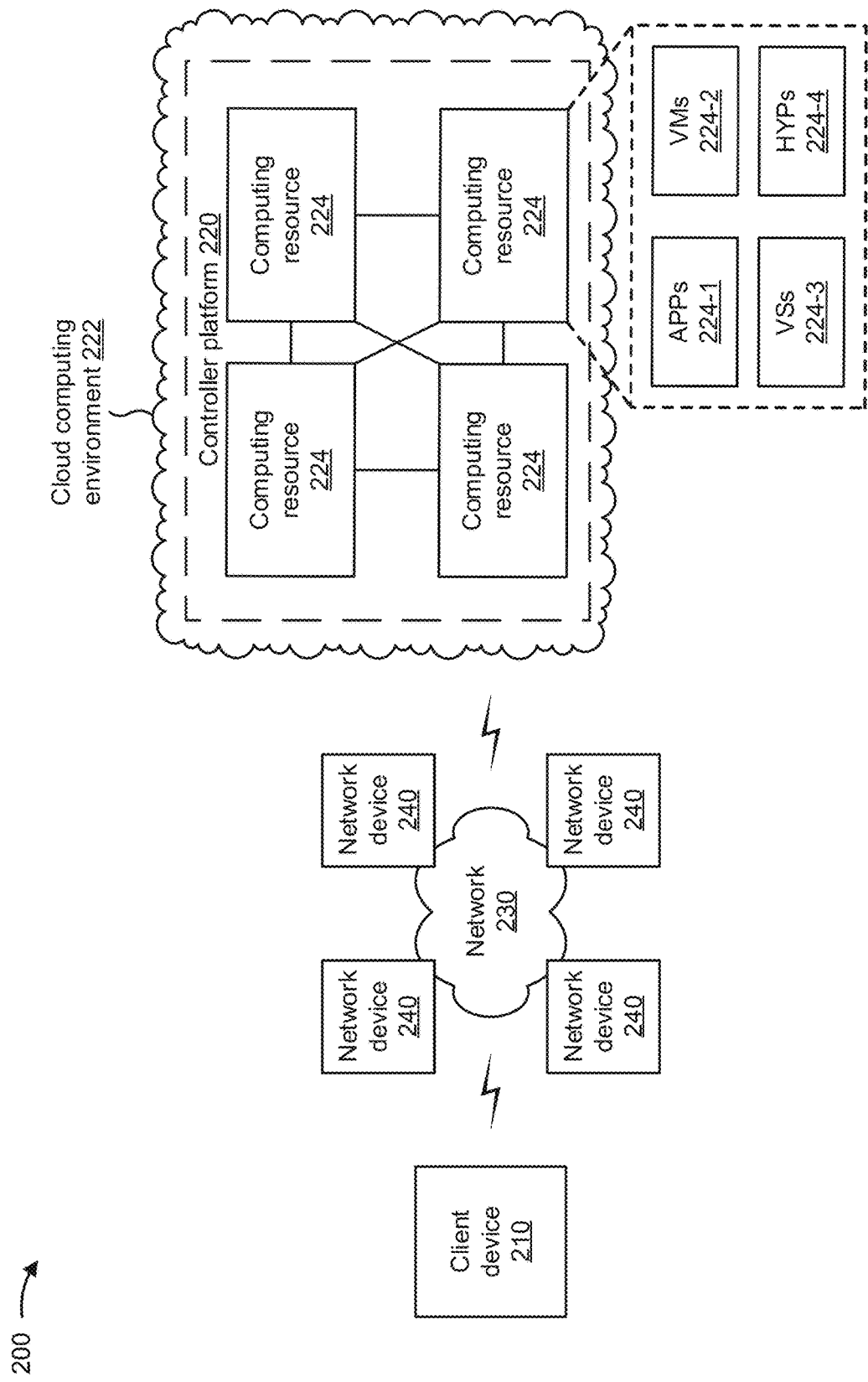
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that utilize egress peer engineering to determine optimized traffic plans and to implement an optimized traffic plan. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 240 may include a gateway, a switch, a firewall, a hub, a bridge, a reverse proxy, a server (e.g., a proxy server, a cloud server, a data center server, etc.), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
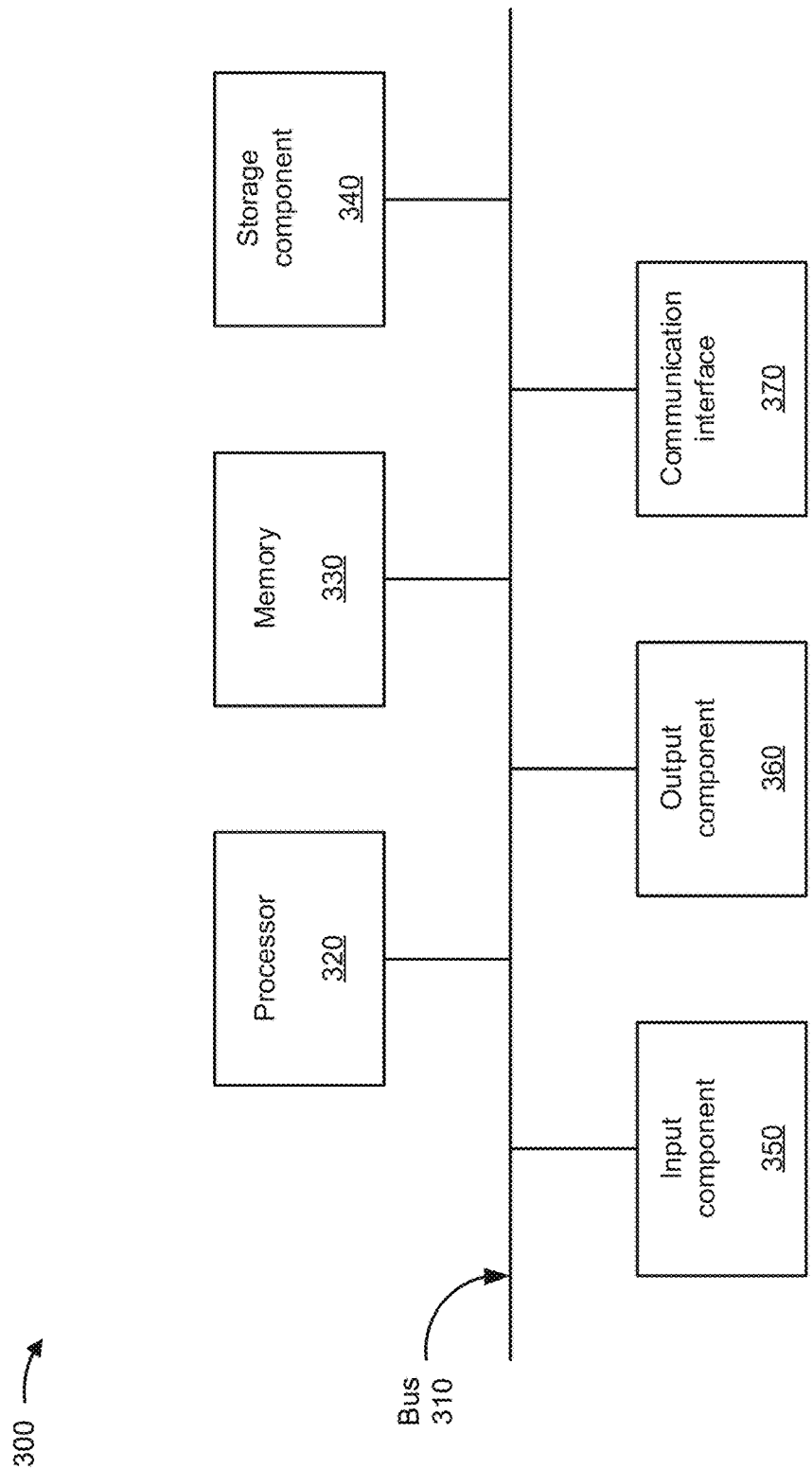
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
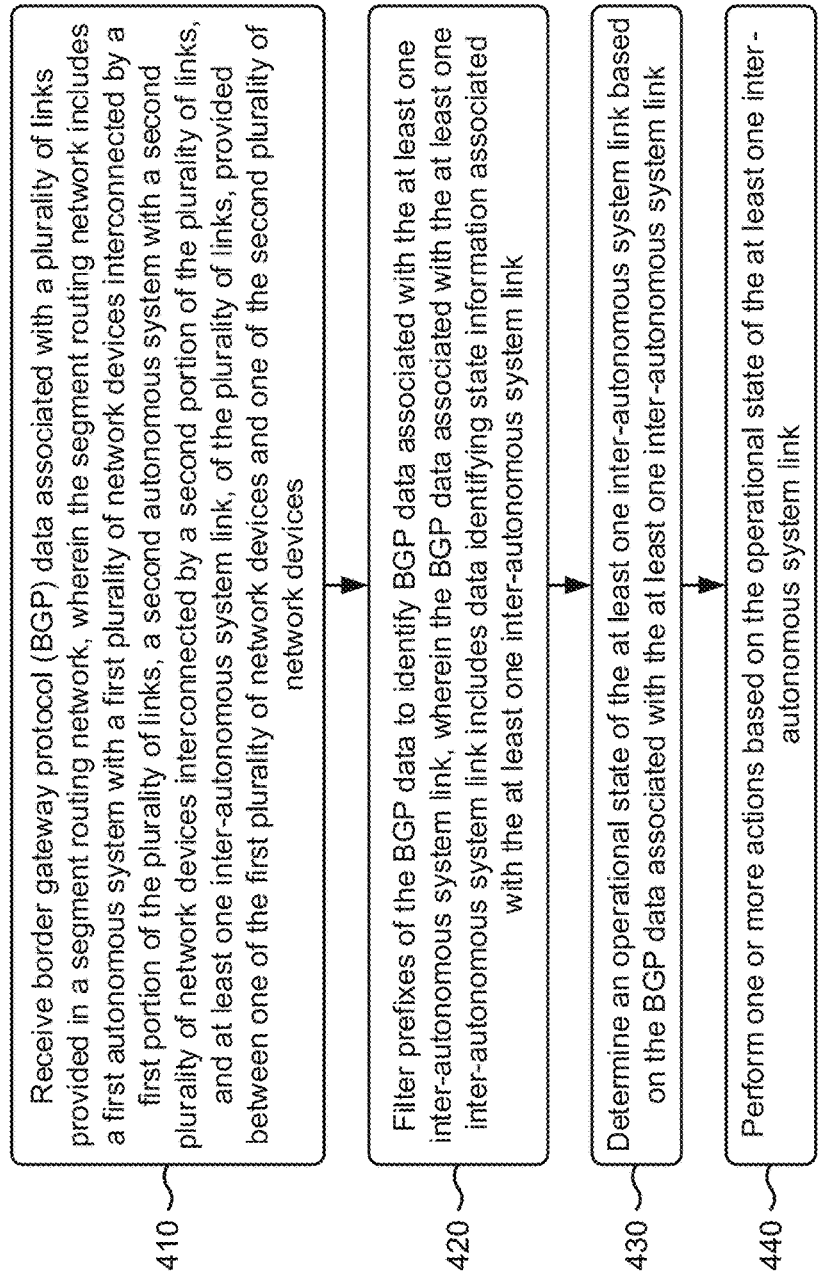
FIGS. 4-6 are flow charts of example processes for utilizing a centralized controller for traffic engineering segment routing inter-autonomous systems.

FIG. 4 is a flow chart of an example process 400 for utilizing a centralized controller for traffic engineering segment routing inter-autonomous systems. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as a client device (e.g., client device 210) and/or a network device (e.g., network device 240).

As shown in FIG. 4, process 400 may include receiving border gateway protocol (BGP) data associated with a plurality of links provided in a segment routing network, wherein the segment routing network includes a first autonomous system with a first plurality of network devices interconnected by a first portion of the plurality of links, a second autonomous system with a second plurality of network devices interconnected by a second portion of the plurality of links and at least one inter-autonomous system link, of the plurality of links, provided between one of the first plurality of network devices and one of the second plurality of network devices (block 410). For example, the controller platform (e.g., using computing resource 224, processor 320, communication interface 370, and/or the like) may receive border gateway protocol (BGP) data associated with a plurality of links provided in a segment routing network, as described above in connection with FIGS. 1A-3. In some aspects, the segment routing network may include a first autonomous system with a first plurality of network devices interconnected by a first portion of the plurality of links, a second autonomous system with a second plurality of network devices interconnected by a second portion of the plurality of links, and at least one inter-autonomous system link, of the plurality of links, provided between one of the first plurality of network devices and one of the second plurality of network devices.

As further shown in FIG. 4, process 400 may include filtering prefixes of the BGP data to identify BGP data associated with the at least one inter-autonomous system link, wherein the BGP data associated with the at least one inter-autonomous system link includes data identifying state information associated with the at least one inter-autonomous system link (block 420). For example, the controller platform (e.g., using computing resource 224, processor 320, memory 330, and/or the like) may filter prefixes of the BGP data to identify BGP data associated with the at least one inter-autonomous system link, as described above in connection with FIGS. 1A-3. In some aspects, the BGP data associated with the at least one inter-autonomous system link may include data identifying state information associated with the at least one inter-autonomous system link.

As further shown in FIG. 4, process 400 may include determining an operational state of the at least one inter-autonomous system link based on the BGP data associated with the at least one inter-autonomous system link (block 430). For example, the controller platform (e.g., using computing resource 224, processor 320, storage component 340, and/or the like) may determine an operational state of the at least one inter-autonomous system link based on the BGP data associated with the at least one inter-autonomous system link, as described above in connection with FIGS. 1A-3.

As further shown in FIG. 4, process 400 may include performing one or more actions based on the operational state of the at least one inter-autonomous system link (block 440). For example, the controller platform (e.g., using computing resource 224, processor 320, memory 330, storage component 340, communication interface 370, and/or the like) may perform one or more actions based on the operational state of the at least one inter-autonomous system link, as described above in connection with FIGS. 1A-3.

Process 400 may include additional implementations, such as any single implementation or any combination of implementations described below and/or in connection with one or more other processes described elsewhere herein.

In some implementations, when performing the one or more actions the controller platform may cause the one of the first plurality of network devices and the one of the second plurality of network devices to not utilize the at least one inter-autonomous system link when the at least one inter-autonomous system link is non-operational, may cause the one of the first plurality of network devices and the one of the second plurality of network devices to re-route traffic from the at least one inter-autonomous system link when the at least one inter-autonomous system link is non-operational, may provide information indicating the operational state of the at least one inter-autonomous system link, and/or the like.

In some implementations, the one of the first plurality of network devices and the one of the second plurality of network devices may include a provider edge (PE) network device, an autonomous system border router (ASBR), a peer ASBR, and/or the like.

In some implementations, the controller platform may receive additional BGP data associated with the plurality of links after performing the one or more actions, may filter prefixes of the additional BGP data to identify additional BGP data associated with the at least one inter-autonomous system link, may determine that the at least one inter-autonomous system link is operational based on the additional BGP data associated with the at least one inter-autonomous system link, and may cause the one of the first plurality of network devices and the one of the second plurality of network devices to utilize the at least one inter-autonomous system link based on the at least one inter-autonomous system link being operational.

In some implementations, the controller platform may cause bidirectional forwarding detection (BFD) sessions to be established for another inter-autonomous system link of the plurality of links, wherein the other inter-autonomous system link may be provided between another one of the first plurality of network devices and another one of the second plurality of network devices; may receive BFD session data associated with the other inter-autonomous system link, wherein the BFD data associated with the other inter-autonomous system link may include data identifying session information associated with the other inter-autonomous system link; may determine another operational state of the other inter-autonomous system link based on the BFD data associated with the other inter-autonomous system link; and may perform one or more additional actions based on the other operational state of the other inter-autonomous system link.

In some implementations, when performing the one or more additional actions includes, the controller platform may cause the other one of the first plurality of network devices and the other one of the second plurality of network devices to not utilize the other inter-autonomous system link when the other inter-autonomous system link is non-operational, may cause the other one of the first plurality of network devices and the other one of the second plurality of network devices to re-route traffic from the other inter-autonomous system link when the other inter-autonomous system link is non-operational, may provide information indicating the operational state of the other inter-autonomous system link, and/or the like.

In some implementations, the one of the first plurality of network devices and the one of the second plurality of network devices may not be notified of the operational state of the at least one inter-autonomous system link due to segment routing in the segment routing network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
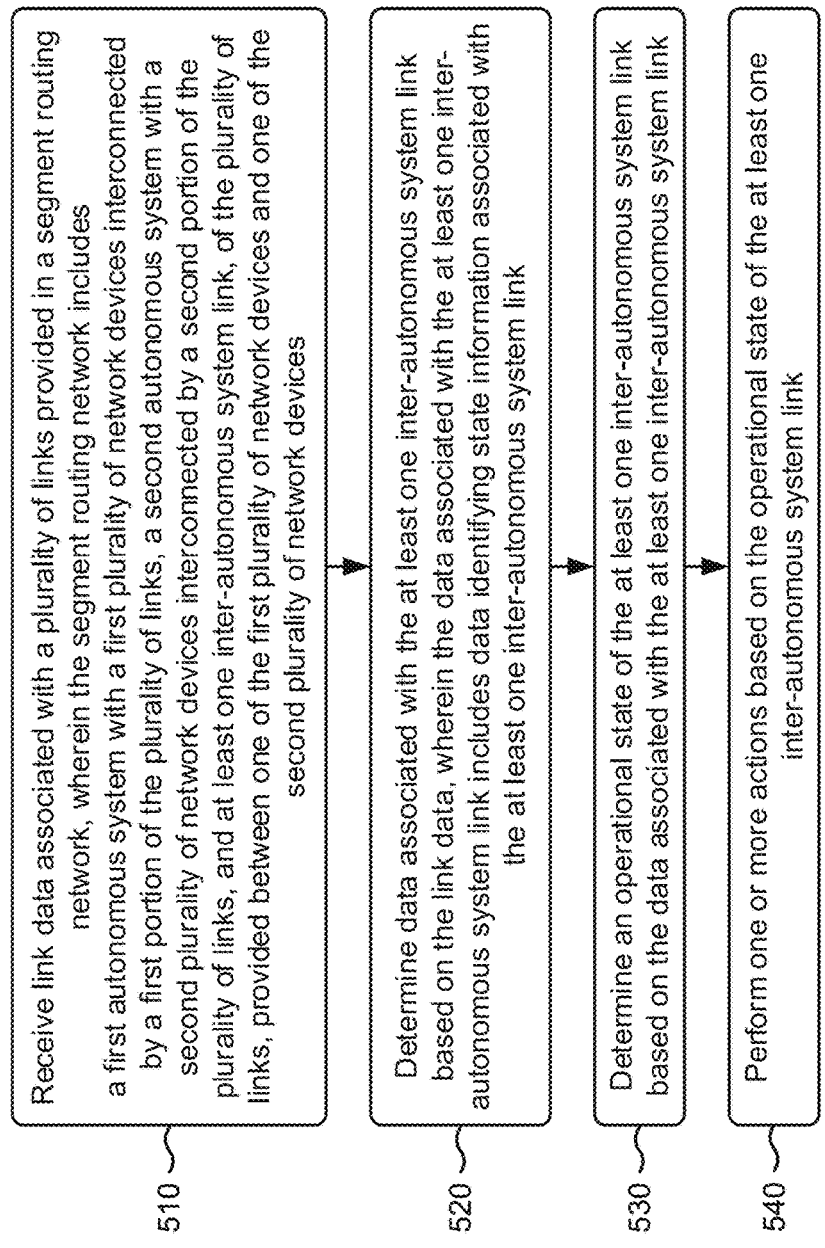

FIG. 5 is a flow chart of an example process 500 for utilizing egress peer engineering to determine optimized traffic plans and to implement an optimized traffic plan. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as a client device (e.g., client device 210) and/or a network device (e.g., network device 240).

As shown in FIG. 5, process 500 may include receiving link data associated with a plurality of links provided in a segment routing network, wherein the segment routing network includes a first autonomous system with a first plurality of network devices interconnected by a first portion of the plurality of links, a second autonomous system with a second plurality of network devices interconnected by a second portion of the plurality of links and at least one inter-autonomous system link, of the plurality of links, provided between one of the first plurality of network devices and one of the second plurality of network devices (block 510). For example, the controller platform (e.g., using computing resource 224, processor 320, communication interface 370, and/or the like) may receive link data associated with a plurality of links provided in a segment routing network, as described above in connection with FIGS. 1A-3. In some aspects, the segment routing network may include a first autonomous system with a first plurality of network devices interconnected by a first portion of the plurality of links, a second autonomous system with a second plurality of network devices interconnected by a second portion of the plurality of links, and at least one inter-autonomous system link, of the plurality of links, provided between one of the first plurality of network devices and one of the second plurality of network devices.

As further shown in FIG. 5, process 500 may include determining data associated with the at least one inter-autonomous system link based on the link data wherein the data associated with the at least one inter-autonomous system link includes data identifying state information associated with the at least one inter-autonomous system link (block 520). For example, the controller platform (e.g., using computing resource 224, processor 320, memory 330, and/or the like) may determine data associated with the at least one inter-autonomous system link based on the link data, as described above in connection with FIGS. 1A-3. In some aspects, the data associated with the at least one inter-autonomous system link may include data identifying state information associated with the at least one inter-autonomous system link.

As further shown in FIG. 5, process 500 may include determining an operational state of the at least one inter-autonomous system link based on the data associated with the at least one inter-autonomous system link (block 530). For example, the controller platform (e.g., using computing resource 224, processor 320, storage component 340, and/or the like) may determine an operational state of the at least one inter-autonomous system link based on the data associated with the at least one inter-autonomous system link, as described above in connection with FIGS. 1A-3.

As further shown in FIG. 5, process 500 may include performing one or more actions based on the operational state of the at least one inter-autonomous system link (block 540). For example, the controller platform (e.g., using computing resource 224, processor 320, memory 330, storage component 340, and/or the like) may perform one or more actions based on the operational state of the at least one inter-autonomous system link, as described above in connection with FIGS. 1A-3.

Process 500 may include additional implementations, such as any single implementation or any combination of implementations described below and/or in connection with one or more other processes described elsewhere herein.

In some implementations, the link data may include border gateway protocol (BGP) data associated with the plurality of links provided in the segment routing network, bidirectional forwarding detection (BFD) session data associated with the plurality of links provided in the segment routing network, and/or the like.

In some implementations, when performing the one or more actions, the controller platform may provide, to the one of the first plurality of network devices and the one of the second plurality of network devices, information instructing the one of the first plurality of network devices and the one of the second plurality of network devices to cease utilization of the at least one inter-autonomous system link when the at least one inter-autonomous system link is non-operational, and re-route traffic from the at least one inter-autonomous system link.

In some implementations, when performing the one or more actions, the controller platform may identify, when the at least one inter-autonomous system link is non-operational, another inter-autonomous system link, of the plurality of links, provided between the one of the first plurality of network devices and the one of the second plurality of network devices, where the other inter-autonomous system link is operational; and may cause the one of the first plurality of network devices and the one of the second plurality of network devices to re-route traffic from the at least one inter-autonomous system link to the other inter-autonomous system link.

In some implementations, when identifying the other inter-autonomous system link, the controller platform may identify the other inter-autonomous system link based on a preference, may identify the other inter-autonomous system link based on a random selection technique, may identify the other inter-autonomous system link based on a round-robin technique, and/or the like.

In some implementations, when identifying the other inter-autonomous system link, the controller platform may determine a first portion of the other inter-autonomous system link through the first autonomous system based on a first set of parameters, may determine a second portion of the other inter-autonomous system link between the first autonomous system and the second autonomous system based a second set of parameters, and may determine a third portion of the other inter-autonomous system link through the second autonomous system based on a third set of parameters.

In some implementations, when identifying the other inter-autonomous system link, the controller platform may select a preferred outgoing route for the first autonomous system, from a plurality of outgoing routes, based on a first preference, where the preferred outgoing route may be provided from the first autonomous system to the second autonomous system; may select a preferred incoming route for the first autonomous system, from a plurality of incoming routes, based on a second preference, where the preferred incoming route may be provided from the second autonomous system to the first autonomous system; and may identify the other inter-autonomous system link based on the preferred outgoing route and the preferred incoming route.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
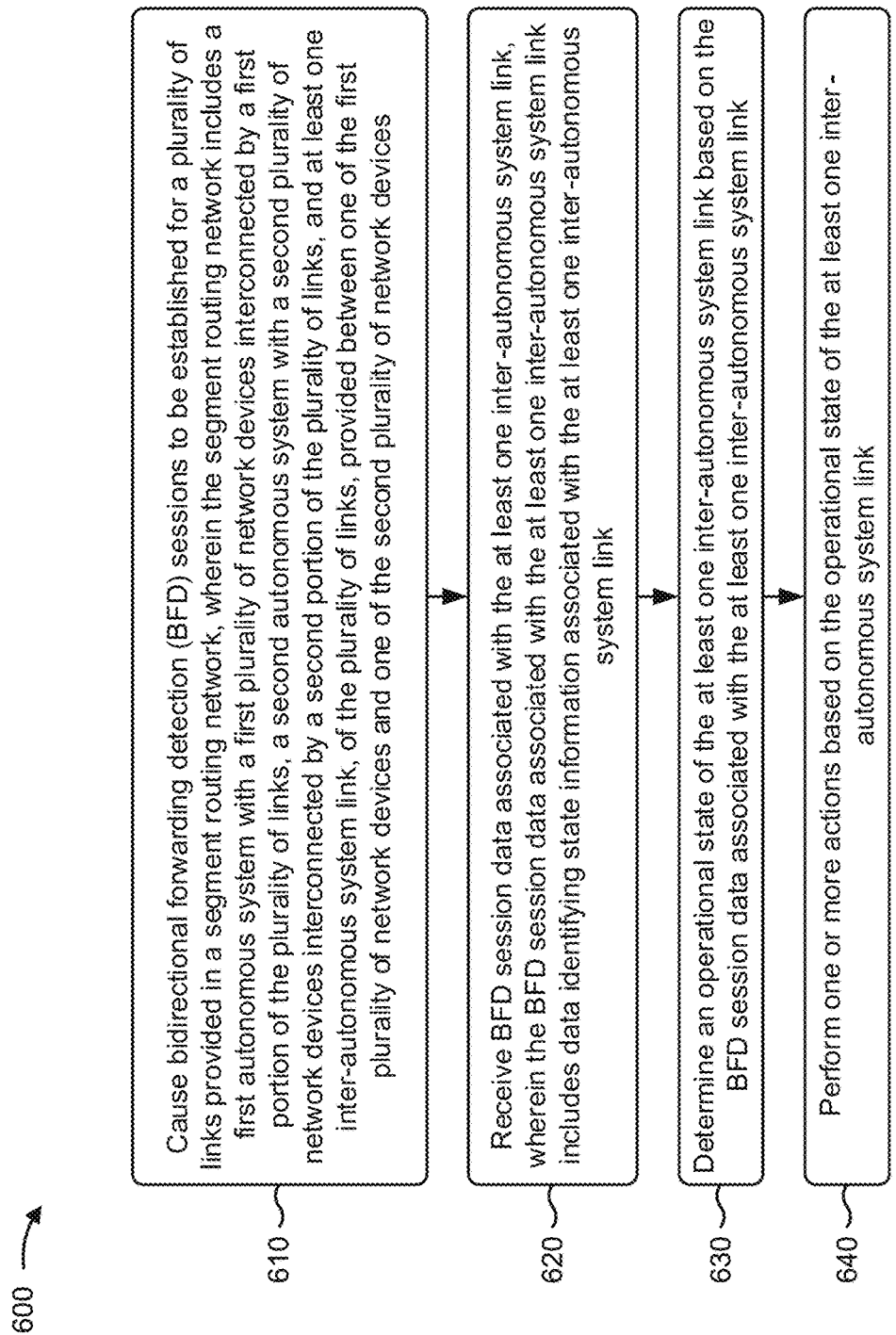

FIG. 6 is a flow chart of an example process 600 for utilizing egress peer engineering to determine optimized traffic plans and to implement an optimized traffic plan. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as a client device (e.g., client device 210) and/or a network device (e.g., network device 240).

As shown in FIG. 6, process 600 may include causing bidirectional forwarding detection (BFD) sessions to be established for a plurality of links provided in a segment routing network, wherein the segment routing network includes a first autonomous system with a first plurality of network devices interconnected by a first portion of the plurality of links, a second autonomous system with a second plurality of network devices interconnected by a second portion of the plurality of links, and at least one inter-autonomous system link, of the plurality of links, provided between one of the first plurality of network devices and one of the second plurality of network devices (block 610). For example, the controller platform (e.g., using computing resource 224, processor 320, memory 330, communication interface 370, and/or the like) may cause bidirectional forwarding detection (BFD) sessions to be established for a plurality of links provided in a segment routing network, as described above in connection with FIGS. 1A-3. In some aspects, the segment routing network may include a first autonomous system with a first plurality of network devices interconnected by a first portion of the plurality of links, a second autonomous system with a second plurality of network devices interconnected by a second portion of the plurality of links, and at least one inter-autonomous system link, of the plurality of links, provided between one of the first plurality of network devices and one of the second plurality of network devices.

As further shown in FIG. 6, process 600 may include receiving BFD session data associated with the at least one inter-autonomous system link, wherein the BFD session data associated with the at least one inter-autonomous system link includes data identifying state information associated with the at least one inter-autonomous system link (block 620). For example, the controller platform (e.g., using computing resource 224, processor 320, and/or the like) may receive BFD session data associated with the at least one inter-autonomous system link, as described above in connection with FIGS. 1A-3. In some aspects, the BFD session data associated with the at least one inter-autonomous system link may include data identifying state information associated with the at least one inter-autonomous system link.

As further shown in FIG. 6, process 600 may include determining an operational state of the at least one inter-autonomous system link based on the BFD session data associated with the at least one inter-autonomous system link (block 630). For example, the controller platform (e.g., using computing resource 224, processor 320, memory 330, and/or the like) may determine an operational state of the at least one inter-autonomous system link based on the BFD session data associated with the at least one inter-autonomous system link, as described above in connection with FIGS. 1A-3.

As further shown in FIG. 6, process 600 may include performing one or more actions based on the operational state of the at least one inter-autonomous system link (block 640). For example, the controller platform (e.g., using computing resource 224, processor 320, memory 330, storage component 340, communication interface 370, and/or the like) may perform one or more actions based on the operational state of the at least one inter-autonomous system link, as described above in connection with FIGS. 1A-3.

Process 600 may include additional implementations, such as any single implementation or any combination of implementations described below and/or in connection with one or more other processes described elsewhere herein.

In some implementations, the controller platform may cause the one of the first plurality of network devices and the one of the second plurality of network devices to not utilize the at least one inter-autonomous system link when the at least one inter-autonomous system link is non-operational, may cause the one of the first plurality of network devices and the one of the second plurality of network devices to re-route traffic from the at least one inter-autonomous system link when the at least one inter-autonomous system link is non-operational, may provide information indicating the operational state of the at least one inter-autonomous system link, and/or the like.

In some implementations, the controller platform may receive additional BFD data associated with the at least one inter-autonomous system link, may determine that the at least one inter-autonomous system link is operational based on the additional BFD data associated with the at least one inter-autonomous system link, and may cause the one of the first plurality of network devices and the one of the second plurality of network devices to utilize the at least one inter-autonomous system link based on the at least one inter-autonomous system link being operational.

In some implementations, the one of the first plurality of network devices and the one of the second plurality of network devices may not be notified of the operational state of the at least one inter-autonomous system link due to segment routing in the segment routing network.

In some implementations, the controller platform may provide, to the one of the first plurality of network devices and the one of the second plurality of network devices, information instructing the one of the first plurality of network devices and the one of the second plurality of network devices to cease utilization of the at least one inter-autonomous system link when the at least one inter-autonomous system link is non-operational, and to re-route traffic from the at least one inter-autonomous system link.

In some implementations, the controller platform may identify, when the at least one inter-autonomous system link is non-operational, another inter-autonomous system link, of the plurality of links, provided between the one of the first plurality of network devices and the one of the second plurality of network devices, where the other inter-autonomous system link may be operational; and may cause the one of the first plurality of network devices and the one of the second plurality of network devices to re-route traffic from the at least one inter-autonomous system link to the other inter-autonomous system link.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, data associated with a plurality of links provided in a network,
      wherein the network includes at least one inter-autonomous system link, of the plurality of links, provided between one of a first plurality of network devices included in a first autonomous system of the network and one of a second plurality of network devices included in a second autonomous system of the network;
   identifying, by the device, and based on the data associated with the plurality of links, data associated with the at least one inter-autonomous system link;
   determining, by the device, an operational state of the at least one inter-autonomous system link based on the data associated with the at least one inter-autonomous system link;
   performing, by the device, one or more actions based on the operational state of the at least one inter-autonomous system link;
   receiving, by the device, bidirectional forwarding detection session data associated with another inter-autonomous system link of the plurality of links;
   determining, by the device, another operational state of the other inter-autonomous system link based on the bidirectional forwarding detection session data associated with the other inter-autonomous system link; and
   performing, by the device, one or more additional actions based on the other operational state of the other inter-autonomous system link.

2. The method of claim 1, wherein the data is border gateway protocol data.

3. The method of claim 1, wherein performing the one or more actions comprises:
   causing the one of the first plurality of network devices and the one of the second plurality of network devices to not utilize the at least one inter-autonomous system link when the at least one inter-autonomous system link is non-operational;
   causing the one of the first plurality of network devices and the one of the second plurality of network devices to re-route traffic from the at least one inter-autonomous system link when the at least one inter-autonomous system link is non-operational; or
   providing information indicating the operational state of the at least one inter-autonomous system link.

4. The method of claim 1, wherein the one of the first plurality of network devices and the one of the second plurality of network devices include one of:

a provider edge network device, or
an autonomous system border router.

5. The method of claim 1, further comprising:
receiving additional data associated with the plurality of links after performing the one or more actions;
filtering the additional data to identify additional data associated with the at least one inter-autonomous system link;
determining that the at least one inter-autonomous system link is operational based on the additional data associated with the at least one inter-autonomous system link; and
causing the one of the first plurality of network devices and the one of the second plurality of network devices to utilize the at least one inter-autonomous system link based on the at least one inter-autonomous system link being determined to be operational.

6. The method of claim 1, further comprising:
identifying the other inter-autonomous system link, wherein identifying the other inter-autonomous system link comprises:
determining a first portion of the other inter-autonomous system link through the first autonomous system based on a first set of parameters;
determining a second portion of the other inter-autonomous system link between the first autonomous system and the second autonomous system based on a second set of parameters; and
determining a third portion of the other inter-autonomous system link through the second autonomous system based on a third set of parameters.

7. The method of claim 1, further comprising:
causing bidirectional forwarding detection sessions to be established for the other inter-autonomous system link of the plurality of links.

8. A device, comprising:
one or more memories; and
one or more processors, to:
receive link data associated with a plurality of links provided in a network,
wherein the network includes at least one inter-autonomous system link, of the plurality of links, provided between one of a first plurality of network devices included in a first autonomous system of the network and one of a second plurality of network devices included in a second autonomous system of the network;
identify an operational state of the at least one inter-autonomous system link based on bidirectional forwarding detection session data associated with the at least one inter-autonomous system link; and
perform one or more actions based on the operational state of the at least one inter-autonomous system link.

9. The device of claim 8, wherein the network is a segment routing network, and
wherein the link data includes one or more of:
border gateway protocol data associated with the plurality of links provided in the segment routing network, or
session data associated with the plurality of links provided in the segment routing network.

10. The device of claim 8, wherein the one or more processors are to:
provide, to the one of the first plurality of network devices and the one of the second plurality of network devices, information instructing the one of the first plurality of network devices and the one of the second plurality of network devices to re-route traffic from the at least one inter-autonomous system link when the at least one inter-autonomous system link is non-operational.

11. The device of claim 8, wherein the one or more processors, when performing the one or more actions, are to:
identify, when the at least one inter-autonomous system link is non-operational, another inter-autonomous system link, of the plurality of links, provided between the one of the first plurality of network devices and the one of the second plurality of network devices, wherein the other inter-autonomous system link is operational; and
cause the one of the first plurality of network devices and the one of the second plurality of network devices to re-route traffic from the at least one inter-autonomous system link to the other inter-autonomous system link.

12. The device of claim 11, wherein the one or more processors, when identifying the other inter-autonomous system link, are to one or more of:
identify the other inter-autonomous system link based on a preference;
identify the other inter-autonomous system link based on a random selection technique; or
identify the other inter-autonomous system link based on a round-robin technique.

13. The device of claim 11, wherein the one or more processors, when identifying the other inter-autonomous system link, are to one or more of:
determine a first portion of the other inter-autonomous system link through the first autonomous system based on a first set of parameters;
determine a second portion of the other inter-autonomous system link between the first autonomous system and the second autonomous system based a second set of parameters; or
determine a third portion of the other inter-autonomous system link through the second autonomous system based on a third set of parameters.

14. The device of claim 11, wherein the one or more processors, when identifying the other inter-autonomous system link, are to:
select a preferred outgoing route, from a plurality of outgoing routes, from the first autonomous system to the second autonomous system;
select a preferred incoming route, from a plurality of incoming routes, from the second autonomous system to the first autonomous system; and
identify the other inter-autonomous system link based on the preferred outgoing route and the preferred incoming route.

15. A non-transitory computer-readable medium storing instructions, the instructions comprising:
one or more instructions that, when executed by one or more processors, cause the one or more processors to:
receive bidirectional forwarding detection session data associated with at least one inter-autonomous system link of a plurality of links of a network, the at least one inter-autonomous system link provided between one of a first plurality of network devices included in a first autonomous system of the network and one of a second plurality of network devices included in a second autonomous system of the network;
determine an operational state of the at least one inter-autonomous system link based on the bidirectional forwarding detection session data associated with the at least one inter-autonomous system link; and perform one or more actions based on the operational state of the at least one inter-autonomous system link.

16. The non-transitory computer-readable medium of claim 15, wherein the instructions further comprise one or more instructions that, when executed by the one or more processors, cause the one or more processors to:
receive additional bidirectional forwarding detection session data associated with the at least one inter-autonomous system link;
determine that the at least one inter-autonomous system link is operational based on the additional bidirectional forwarding detection session data associated with the at least one inter-autonomous system link; and
cause the one of the first plurality of network devices and the one of the second plurality of network devices to utilize the at least one inter-autonomous system link based on the at least one inter-autonomous system link being operational.

17. The non-transitory computer-readable medium of claim 15, wherein the bidirectional forwarding detection session data associated with the at least one inter-autonomous system link includes data identifying state information associated with the at least one inter-autonomous system link.

18. The non-transitory computer-readable medium of claim 15, wherein the one or more instructions, that cause the one or more processors to perform the one or more actions, cause the one or more processors to:
provide, to the one of the first plurality of network devices and the one of the second plurality of network devices, information instructing the one of the first plurality of network devices and the one of the second plurality of network devices to re-route traffic from the at least one inter-autonomous system link when the at least one inter-autonomous system link is non-operational.

19. The non-transitory computer-readable medium of claim 15, wherein the one or more instructions, that cause the one or more processors to perform the one or more actions, cause the one or more processors to:
identify, when the at least one inter-autonomous system link is non-operational, another inter-autonomous system link, of the plurality of links, provided between the one of the first plurality of network devices and the one of the second plurality of network devices, wherein the other inter-autonomous system link is operational; and
cause the one of the first plurality of network devices and the one of the second plurality of network devices to re-route traffic from the at least one inter-autonomous system link to the other inter-autonomous system link.

20. The non-transitory computer-readable medium of claim 15, wherein the instructions further comprise one or more instructions that, when executed by the one or more processors, cause the one or more processors to:
causing bidirectional forwarding detection sessions to be established for the at least one inter-autonomous system link.

* * * * *

UNITED STATES PATENT AND TRADEMARK OFFICE
CERTIFICATE OF CORRECTION

Page 1 of 1

PATENT NO. : 11,627,068 B2
APPLICATION NO. : 17/248372
DATED : April 11, 2023
INVENTOR(S) : Roslan Bin Md Zaki et al.

It is certified that error appears in the above-identified patent and that said Letters Patent is hereby corrected as shown below:

On the Title Page

Item (72) change "Inventors: Rosian Bin Md Zaki, Raritan, NJ" to -- Inventors: Roslan Bin Md Zaki, Raritan, NJ, --

Signed and Sealed this
Sixth Day of May, 2025

Coke Morgan Stewart
*Acting Director of the United States Patent and Trademark Office*